United States Patent [19]
Krieger

[11] 3,918,541
[45] Nov. 11, 1975

[54] VEHICLE CAB WITH DISSIMILAR SOUND ABSORBING MATERIAL

[75] Inventor: Gregory A. Krieger, Brookfield, Wis.

[73] Assignee: Allis-Chalmers Corporation, Milwaukee, Wis.

[22] Filed: Feb. 11, 1974

[21] Appl. No.: 441,558

[52] U.S. Cl............... 180/69 R; 180/89 R; 180/90; 181/33 K
[51] Int. Cl.²......................................... B62D 25/10
[58] Field of Search............ 181/33 R, 33 G, 33 K; 296/39 A; 180/69 R, 89 R, 90

[56] References Cited
UNITED STATES PATENTS

| 2,843,419 | 7/1958 | Wilfert............................. 296/39 A |
| 3,056,707 | 10/1962 | Helbing et al.............. 181/33 G UX |
| 3,196,975 | 7/1965 | Voelker........................... 181/33 R |
| 3,540,547 | 11/1970 | Coward..................... 181/33 G UX |
| 3,774,710 | 11/1973 | Gustavsson.................. 181/33 K X |
| 3,789,945 | 2/1974 | Hansen............................ 180/69 R |
| 3,831,704 | 8/1974 | Zuege............................. 180/89 R |

Primary Examiner—Stephen J. Tomsky
Assistant Examiner—John F. Gonzales
Attorney, Agent, or Firm—Arthur L. Nelson

[57] ABSTRACT

A vehicle platform isolated from the vehicle chassis by resilient mounts to isolate the operator station from structure transmitted sound from the engine compartment. The control console between the engine compartment and the operator station defines a sound absorbing chamber containing sound absorbing material to attenuate airborne sound transmitted from the engine compartment toward the operator station.

10 Claims, 8 Drawing Figures

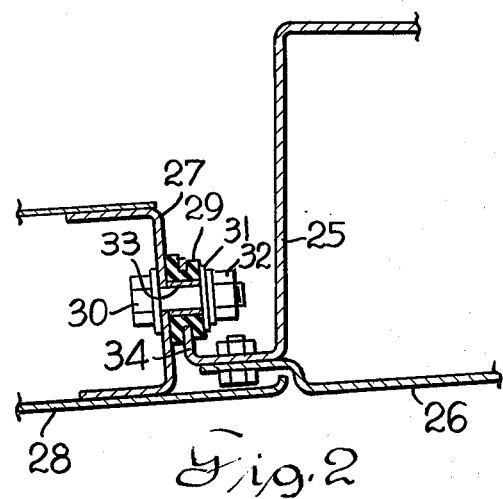
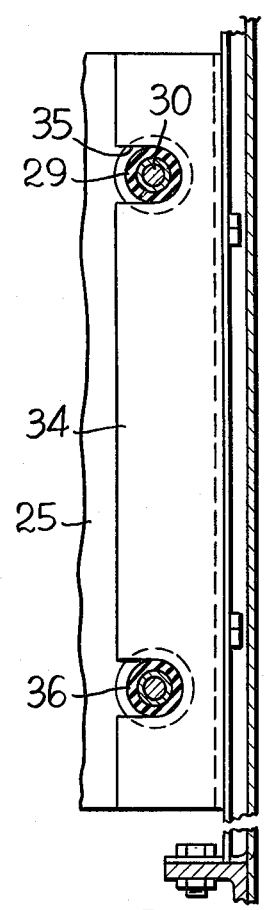
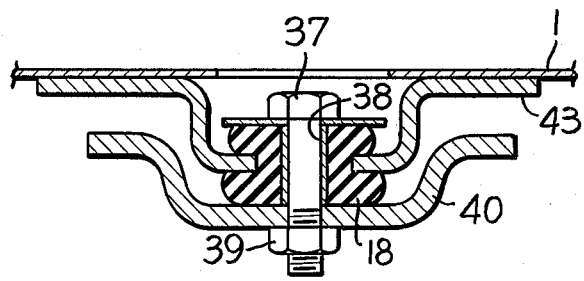
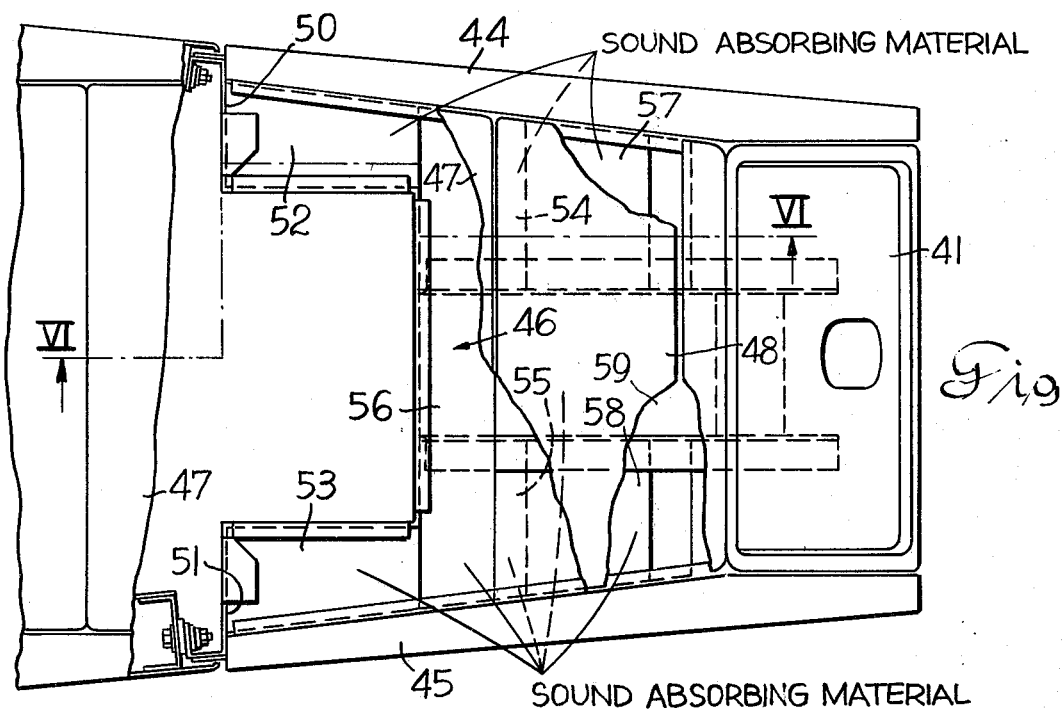

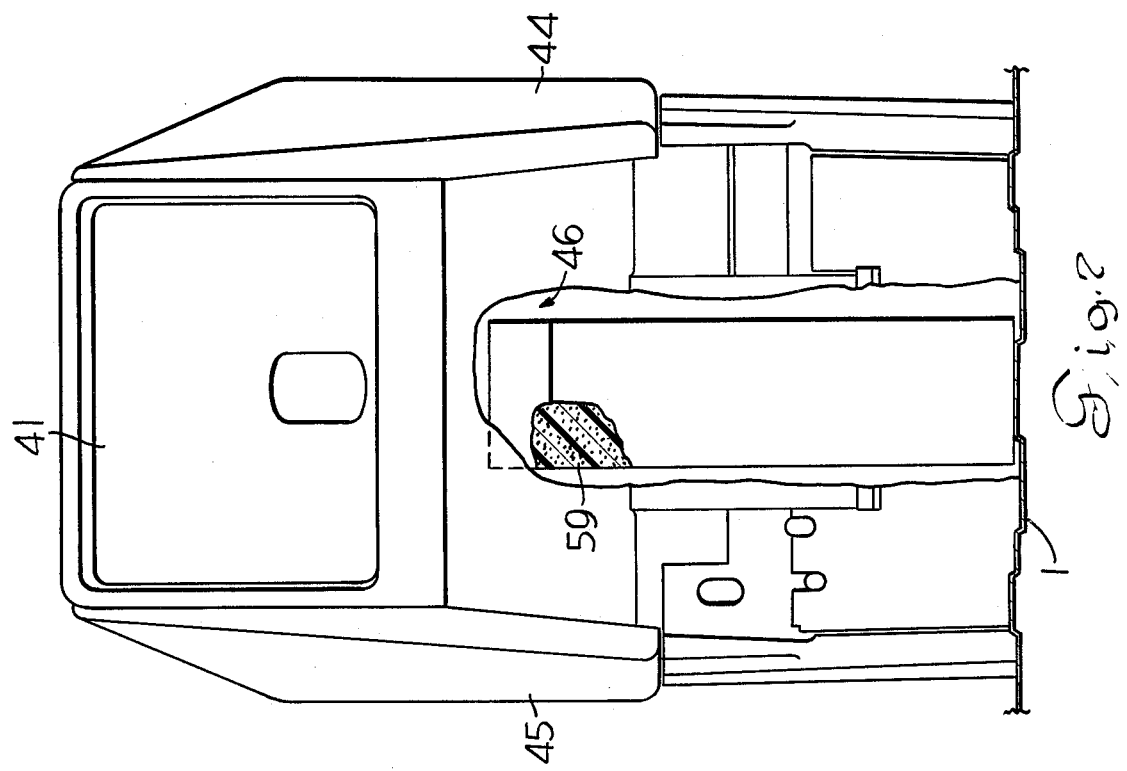
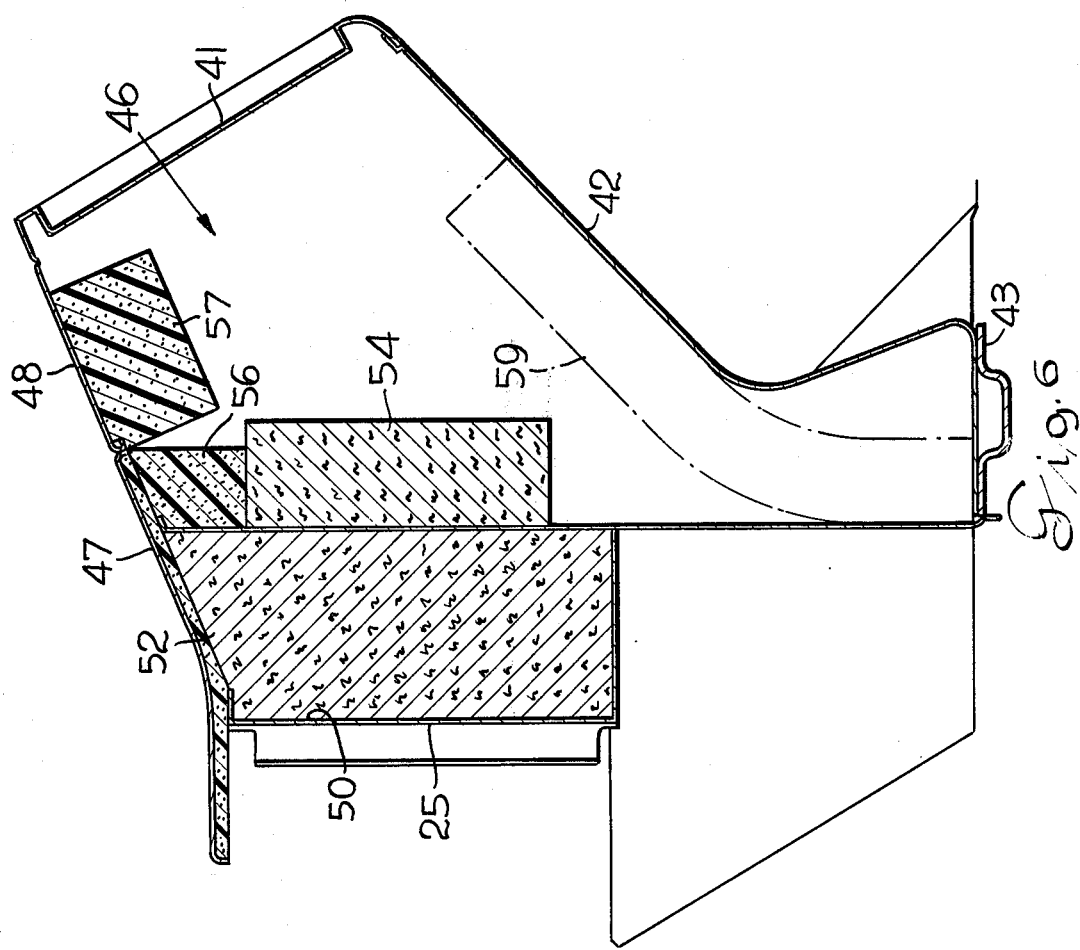

VEHICLE CAB WITH DISSIMILAR SOUND ABSORBING MATERIAL

This invention relates to a motor vehicle with sound attenuating means and more particularly to a sound absorbing chamber defined by the control console between the operator station and the engine compartment for absorbing airborne sound in sound absorbing material in a chamber.

A trend of the modern tractor is toward a vehicle of larger size with a higher speed engine developing greater horsepower. The increase in horsepower and speed of the engine inherently creates a greater noise output which in turn tends to increase the noise level at the operator station. Accordingly, it is desirable to hold the noise levels at the operator station below a predetermined decibel output.

Various means have been devised for reducing the sound level at the operator station. A high density shield or sound deadening barrier such as a lead plate may be used as a sound deadening means since lead or other dense materials are too dense to transmit sound and are more likely to reflect the sound. Leaded insulating materials have been used since they tend to create an effect similar to a dense material such as a lead plate and thereby deaden the sound and reduce the sound transmitted to the operator station. These devices, however, while in part do accomplish the purpose desired, the use of these types of materials are limited because they are unnecessarily heavy and expensive. It is also a problem to prevent sound from being transmitted through the vehicle chassis to the operator station thereby increasing the noise level at the operator station.

Accordingly, this invention provides for a control console on a platform which is resiliently supported on the chassis to prevent transmission of sound through the structure of the vehicle. The resilient mounts between the chassis and the platform interrupt the transmission sound to thereby prevent transmission of sound through the structure of the vehicle. An airtight fire wall is positioned in the front of the control console to prevent sound from being transmitted through openings in the fire wall. The console defines a chamber containing sound absorbing material which attenuates transmission of airborne sound through the chamber in the control console. The sound absorbing material is preferably of two different compositions defining a porous structure for absorbing the sound. Preferably the one material will be a matted fiber glass which is formed to fit a portion of the chamber in a control console. An open-cell foam material is also used which absorbs a different sound frequency than the fiber glass. The sound absorbing materials in the chamber absorb sound that is transmitted into and reverberates in the chamber and thereby substantially reduces sound transmission from the engine compartment to the operator station. Accordingly, the sound level at the operator station is substantially reduced to improve the operating conditions. This is particularly true when a vehicle cab is used on the vehicle since the noise normally transmitted to the cab generates sound waves which reverberates within the cab to increase the noise level. Accordingly, this invention reduces sound transmission through the vehicle structure to the operator station and also airborne sound transmission to the operator station.

It is an object of this invention to provide a chamber having a sound absorbing material for attenuating sound transmitted from the engine compartment to the operator station.

It is another object of this invention to provide a resiliently mounted sound absorbing chamber to interrupt structural sound transmission and attenuate airborne sound transmitted through a sound absorbing chamber to maintain a low noise level at the operator station.

It is a further object of this invention to provide a control console mounted on the vehicle platform at the operator station which is resiliently mounted on the vehicle chassis to prevent structural sound transmission and a chamber having sound absorbing material to attenuate airborne sound transmission from the engine compartment to the operator station.

It is a further object of this invention to use two different sound absorbing materials in which the first absorbs low frequencies and the second absorbs high frequencies within a sound reverberating chamber between the engine compartment and the operator station to provide extensive sound absorption of noise in the chamber which would not be possible with a single sound absorbing material.

The objects of this invention are accomplished by providing an operator station defined by a platform resiliently mounted on the vehicle chassis. A seat is also mounted at the operator station as well as a control console which are mounted in connection with the platform. The resilient mountings on the vehicle chassis block structural sound transmission from the engine compartment to the operator station. A further sound attenuating means is provided through the control console which defines a chamber containing sound absorbing material. Sound absorbing material is of two compositions in which the first attenuates the low frequency sound waves while the second material will attenuate higher frequency sound waves. The sound absorbing material generally forms a porous structure in which the energy of the sound waves is trapped and absorbed as it is transmitted from the engine compartment. The airborne sound traveling into the chamber with the sound absorbing material will be absorbed and the airborne sound transmitted from the engine compartment to the operator station is greatly attenuated. Accordingly, the noise level at the operator station is reduced to substantially improve operating conditions for the operator of the vehicle.

The preferred embodiment of this invention is illustrated in the attached drawings.

FIG. 2 illustrates a cross section view taken on line II—II of FIG. 1.

FIG. 3 illustrates a cross section view taken on line III—III of FIG. 1.

FIG. 4 is an enlarged cross section view of one of the front rubber isolators between the platform and the chassis.

FIG. 5 is a partial plan view of the control console on the vehicle, with portions broken away.

FIG. 6 is a cross section view taken on line VI—VI of FIG. 5.

FIG. 7 is a rear view of the control console with a portion broken away to show the sound absorbing material in the rearward portion of the chamber defined by the control console.

Figure 1:
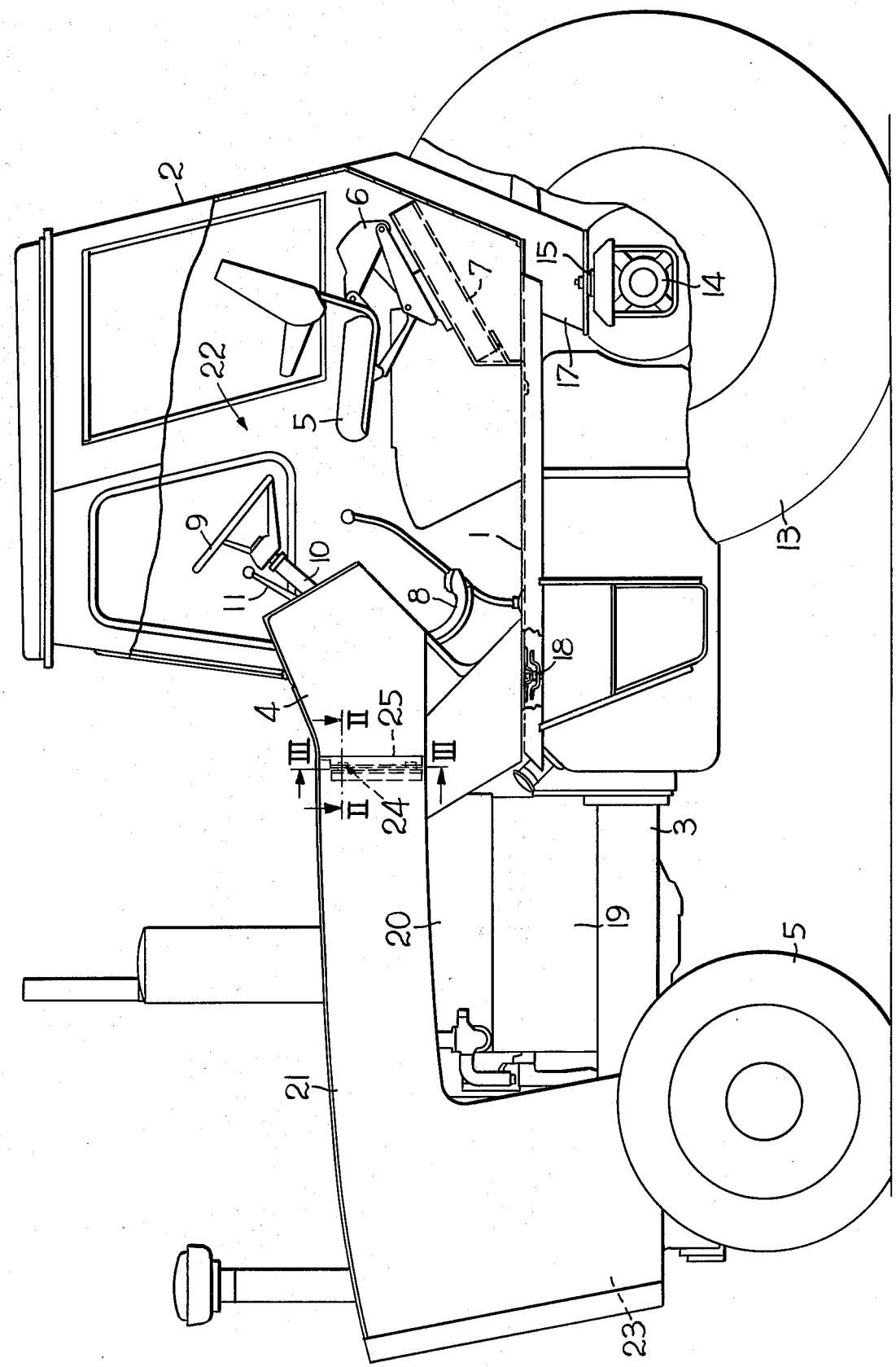
FIG. 1 illustrates a side elevation view of the tractor with the operator station resiliently mounted on the cassis and resiliently connected to the engine hood.

Referring to the drawings, the preferred embodiment of this invention is illustrated.

FIG. 1 illustrates a tractor with fragmentary sections broken away to show the resilient mounting of the platform 1 and cab 2 on the chassis 3. A control console 4 is connected with the platform 1. The seat 5 is also mounted on the linkage 6 and slide rails 7 which are carried by the platform 1. A control console 4 includes pedal 8, steering wheel 9 and steering column 10 as well as the lever 11.

The chassis 3 is supported by the front wheels 5 and rear wheels 13. The rear axle housing 14 supports the rubber isolator 15 which supports the bracket 17 which carries the rear portion of the platform 1. The isolator 18 is mounted on the chassis 3 and resiliently supports the front portion of the platform 1.

The engine 19 is mounted in the engine compartment 20 which is partially formed by the engine hood 21. The engine hood 21 is connected through a resilient connection to the control console 4 which will be subsequently described. The operator station 22 is defined by the cab 2, the control console 4 and seat 5 as well as the platform 1.

The engine 19 is mounted on the chassis 3. The engine hood 21 and the radiator 23 is rigidly mounted on the chassis 13.

The resilient connection 24 between the engine hood 21 and the control console 4 is shown in detail in FIGS. 2 and 3. FIG. 2 shows the fire wall 25 which is connected to the side panel 26 of the control console 4. The supporting bracket 27 carries the side panel 28 of the engine hood 21. A rubber isolator 29 is carried on the bolt 30. The bolt 30 also carries the washer 31 and the nut 32 which fasten the metallic sleeve 33 in the rubber isolator 29. The fire wall 25 forms a flange 34 having a perforation 35 for receiving the isolator 29. The flange 34 extends vertically to form a second resilient isolator 36. A similar connection is provided on the opposite side of the chassis to thereby provide the resilient connection 24 between the engine hood 21 and the control console 4.

FIG. 4 illustrates an enlarged cross section view of the rubber isolator 18. The isolator 18 is carried on the bolt 37 which is embraced by the sleeve 38 and fastened by the nut 39. The platform 1 is suspended on the isolator 18. The bolt 37 is fastened to the bracket 40 on the chassis 3.

FIGS. 5, 6 and 7 show the control console which defines the sound absorbing chamber. The forward wall of the control console is the fire wall 25 which is sealed to form a barrier so sound cannot be transmitted through openings. The rearward wall of the chamber is essentially defined by the dashboard 41 and the supporting panel 42 which extends to the platform 1 and is supported on the bracket 43. The side plates 44 and 45 form the side walls of the chamber 46. The cover plates 47 and 48 form the upper limits of the sound absorbing chamber. The compartments 50 and 51 of the sound absorbing chamber 46 are filled with a fiber glass matted insulation 52 and 53 of approximately 2 pound density. Immediately to the rear of the fiber glass 52 and 53 in chambers 50 and 51 are the fiber glass matted blocks 54 and 55. These blocks 54 and 55 are located in the chamber 46.

Immediately above these two blocks is positioned a transverse block of polyurethane foam of open-celled composition 56 which extends transversely above the blocks 54 and 55.

Immediately to the rear of the block 56 is a pair of blocks 57 and 58 of polyurethane form. A center positioned block of polyurethane foam 59 is positioned on the lower panel 42 and extends to the platform 1. These blocks of insulation are positioned in the chamber 46 to absorb the sound which is transmitted through the fire walls toward the operator station.

Figure 8:
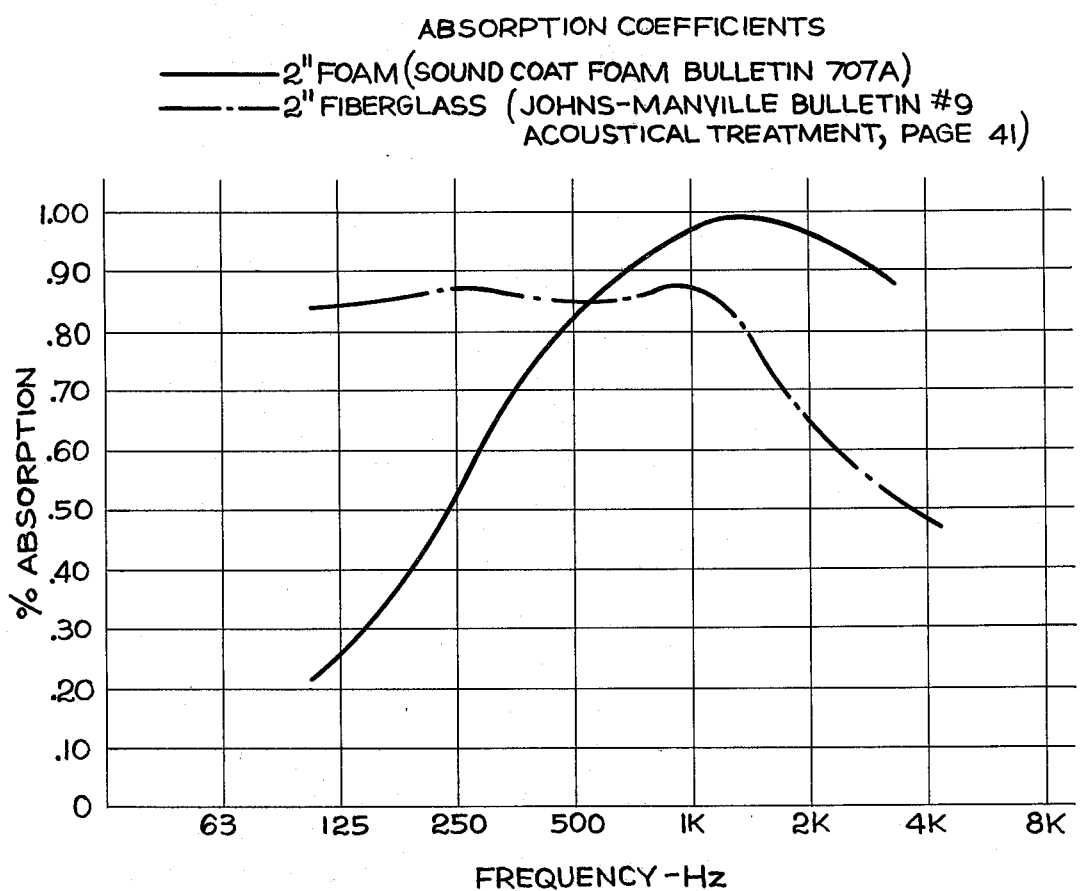
FIG. 8 is a graph showing sound absorption coefficients of the open-cell foam and fiber glass material which are used as a sound absorbing medium in the chamber formed by the control console.

Referring to FIG. 8, a graph illustrates the two types of sound absorbing material. The solid line shows the sound abatement or absorption coefficient of the opened-cell polyurethane foam. The dot dash line shows the sound absorption coefficient of the fiber glass matted insulation of approximately 2 pound density. The combined abatement characteristics of the two show a substantial amount of sound absorption is possible using dissimilar sound absorbing material such as shown in the graph.

The operation of the device will be described in the following paragraphs.

The operator station defined by the cab 2, platform 1 and control console 4 are all integrally connected. The platform 1 is resiliently mounted on the chassis 3 by means of the isolators 18 and 15 underneath the platform 1. Structurally transmitted sound is arrested at the rubber isolators 18 and 15 and prevents vibration and sound transmission to the operator station 22.

The airborne sound transmitted from the engine compartment 20 is transmitted toward the fire wall 25. The fire wall 25 is a sealed partition between the operator station 22 and the engine compartment 20. The fire wall 25 is a steel panel and the sound waves cause the panel to vibrate and transmit a portion of the sound into the chamber 46. Positioned behind the fire wall 25 are the fiber glass sound absorbing blocks 52 and 53. Similarly, the transverse polyurethane foam block 56 and blocks 57 and 58 absorb sound in the area immediately above the fiber glass blocks 54 and 55. Positioned on the rear wall is polyurethane block 59.

The airborne sound from the engine compartment which is transmitted through the fire wall is largely absorbed within the sound absorbing chamber 46. A substantial portion of the sound is prevented from ever entering the sound absorbing chamber 46, however, the sound which is transmitted through the fire wall 25, is largely absorbed in the insulation. Since the fiber glass mat has a greater absorbing characteristic for the low frequencies, a second sound absorbing material consisting essentially of polyurethane foam of opened-celled structure absorbs sound of a higher frequency. Much of the sound reverberating within the chamber 46 is absorbed, which limits the sound transmitted to the operator station thereby maintaining it at a low noise level.

Reference to the graph indicates the combined sound abatement of the two materials. It can be seen that the fiber glass mat absorbs the lower frequencies quite effectively while the polyurethane film absorbs the higher frequencies much more effectively. The combination of the two sound absorbing materials essentially eliminates airborne sound transmission through the sound absorbing chamber 46. The sound absorbing chamber is positioned between the engine compartment and the operator station and accordingly the noise level at the operator station is substantially reduced. It is fundamental that the sound be reduced particularly when a cab is used, since sound reverberates within the cab and intensifies the effect of the sound. Accordingly, it can be seen that airborne sound transmission is attenuated in the sound absorbing chamber by the sound absorbing material which absorbs the two different frequency ranges. The structural transmitted sound from the chassis to the operator station is interrupted by the resilient isolators supporting the operator station. Accordingly, the noise level in the operator station is substantially reduced.

The embodiments of the invention in which an exclusive property or privilege is claimed are defined as follows:

1. A sound absorbing means on a tractor comprising, a platform and a control console defining an operator station, a vehicle chassis, compartment means defining an engine compartment with said compartment means connected to said chassis, resilient means resiliently supporting said platform and control console on said chassis for arresting structural sound transmission from the engine compartment to said operator station, resilient means connecting said compartment means defining said engine compartment to said control console, said control console including a fire wall adjacent said engine compartment, a rearward wall, upper and lower walls, and side walls defining a sound absorbing chamber between said engine compartment and said operator station, blocks of substantial volume of sound absorbing material for absorbing a range of high frequencies and blocks of substantial volume of sound absorbing material for absorbing a range of low frequencies extending into said sound absorbing chamber for absorbing airborne sound over a substantial range of frequencies that is transmitted from said engine compartment into said sound absorbing chamber toward said operator station, said rearward wall including a rearwardly and upwardly inclined portion joining an instrument panel extending upwardly intermediate said upper and lower walls reflecting sound for absorption into said sound absorbing material, said walls reverberating sound for absorption into said sound absorbing material, means supporting said sound absorbing materials on said walls in said sound absorbing chamber of said control console to thereby attenuate sound transmission from the engine compartment to the operator station.

2. A sound absorbing means on a tractor as set forth in claim 1 including a portion of said rearward wall supporting said sound absorbing material in said sound absorbing chamber.

3. A sound absorbing means on a tractor as set forth in claim 1 wherein one of said sound absorbing materials defines a porous structure for attenuating sounds transmitted into said sound absorbing chamber.

4. A sound absorbing means on a tractor as set forth in claim 1, wherein said sound absorbing materials includes a material for absorbing a maximum of low frequency sound under 1000 cycles per second, a material for absorbing a maximum of high frequency sound over 1000 cycles per second for attenuating a broad band width of sound frequencies transmitted into said sound absorbing chamber.

5. A sound absorbing means on a tractor as set forth in claim 1, wherein said fire wall defines a sealed structure providing an airtight seal between said engine compartment and said sound absorbing chamber.

6. A sound absorbing means on a tractor as set forth in claim 1, wherein said sound absorbing materials occupy a substantial volume of the interior of said sound absorbing chamber.

7. A sound absorbing means on a tractor as set forth in claim 6 wherein said sound absorbing materials are supported on the fire wall and the rearward wall in said sound absorbing chamber.

8. A sound absorbing means on a tractor as set forth in claim 1, wherein said sound absorbing materials include an open-cell structure for attenuating sound transmitted into said sound absorbing chamber.

9. The sound absorbing means on a tractor as set forth in claim 1, wherein at least one of said sound absorbing materials includes a polyurethane foam of opened-celled structure.

10. A sound absorbing means on a tractor as set forth in claim 1, wherein at least one of said sound absorbing materials includes a fiber glass mat insulation for attenuating sound in said sound absorbing chamber.

* * * * *